United States Patent [19]

Filderman

[11] 4,064,974
[45] Dec. 27, 1977

[54] ACTUATOR MOUNTING ASSEMBLY FOR A MULTI-DISC BRAKE

[75] Inventor: René Filderman, Asnieres, France

[73] Assignee: Societe Anonyme Francaise du Ferodo, Paris, France

[21] Appl. No.: 694,015

[22] Filed: June 8, 1976

[30] Foreign Application Priority Data

June 13, 1975 France .................................. 75.18525

[51] Int. Cl.² .............................................. F16D 55/36
[52] U.S. Cl. .................................. 188/71.3; 188/71.5; 188/72.5; 188/73.3
[58] Field of Search ................... 188/71.5, 72.1, 72.4, 188/72.5, 196 V, 368, 369, 370, 71.3, 71.4, 73.3; 192/85 AA, 85 AB, 87.11, 87.15, 87.16, 87.17

[56] References Cited

U.S. PATENT DOCUMENTS

| 2,728,420 | 12/1955 | Wright et al. | 188/72.5 X |
|---|---|---|---|
| 2,988,176 | 6/1961 | DuBois | 188/369 X |
| 3,183,999 | 5/1965 | Buyze et al. | 188/370 X |
| 3,337,009 | 8/1967 | Meier | 188/72.5 |
| 3,448,831 | 6/1969 | Newstead | 188/71.5 X |
| 3,559,772 | 2/1971 | Grombka | 188/196 V X |

FOREIGN PATENT DOCUMENTS

| 2,039,951 | 2/1972 | Germany | 188/72.5 |
|---|---|---|---|
| 1,800,549 | 5/1970 | Germany | 188/72.5 |

*Primary Examiner*—Trygve M. Blix
*Assistant Examiner*—Edward R. Kazenske
*Attorney, Agent, or Firm*—Young & Thompson

[57] ABSTRACT

A disc brake for installation on heavy automotive vehicles, comprises at least two rotating discs fixed to each other and spaced apart axially and rigidly fixed on the brake rotor, and a stirrup fixed on the brake stator. The stirrup comprises two external portions between which the discs are disposed, and at least one intermediate portion between the discs. The stirrup portions have pairs of opposed coaxial cylinders to apply friction linings against the discs between them. The cylinders of the intermediate stirrup portion open in opposite axial directions and are staggered circumferentially and are blind and have a depth close to the thickness of the intermediate portion. The portions of the stirrup member are detachably interconnected and extend over an angular sector of about 180° at the top of the brake.

8 Claims, 11 Drawing Figures

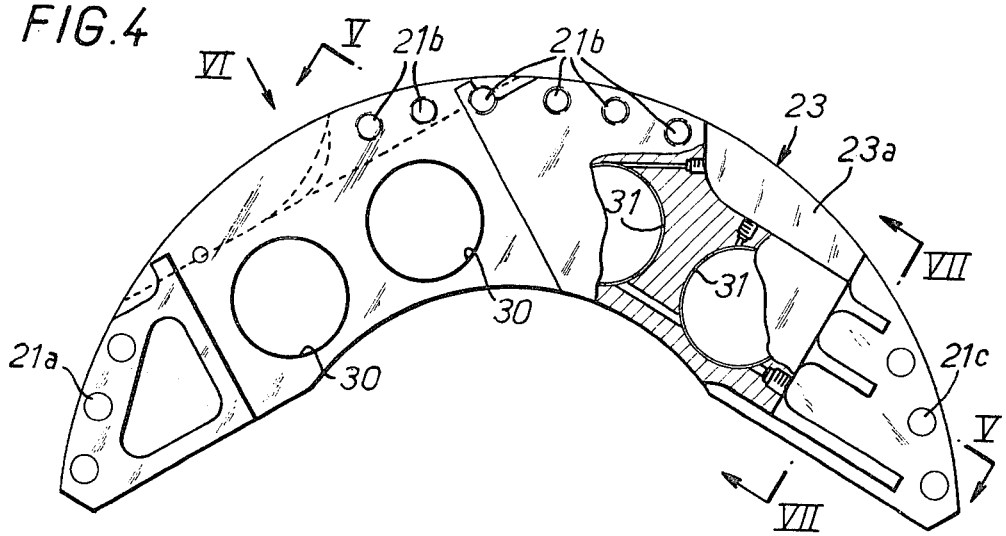
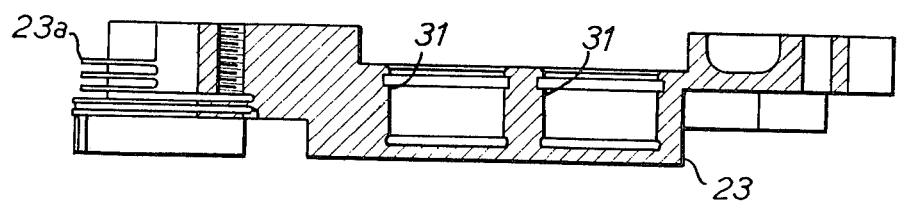
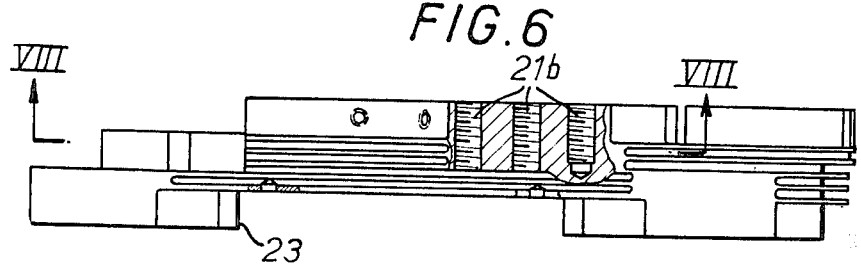
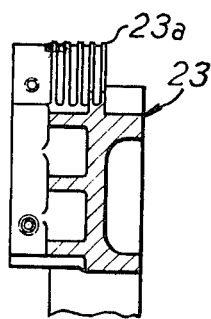
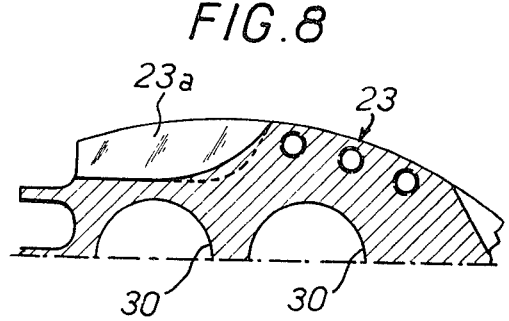

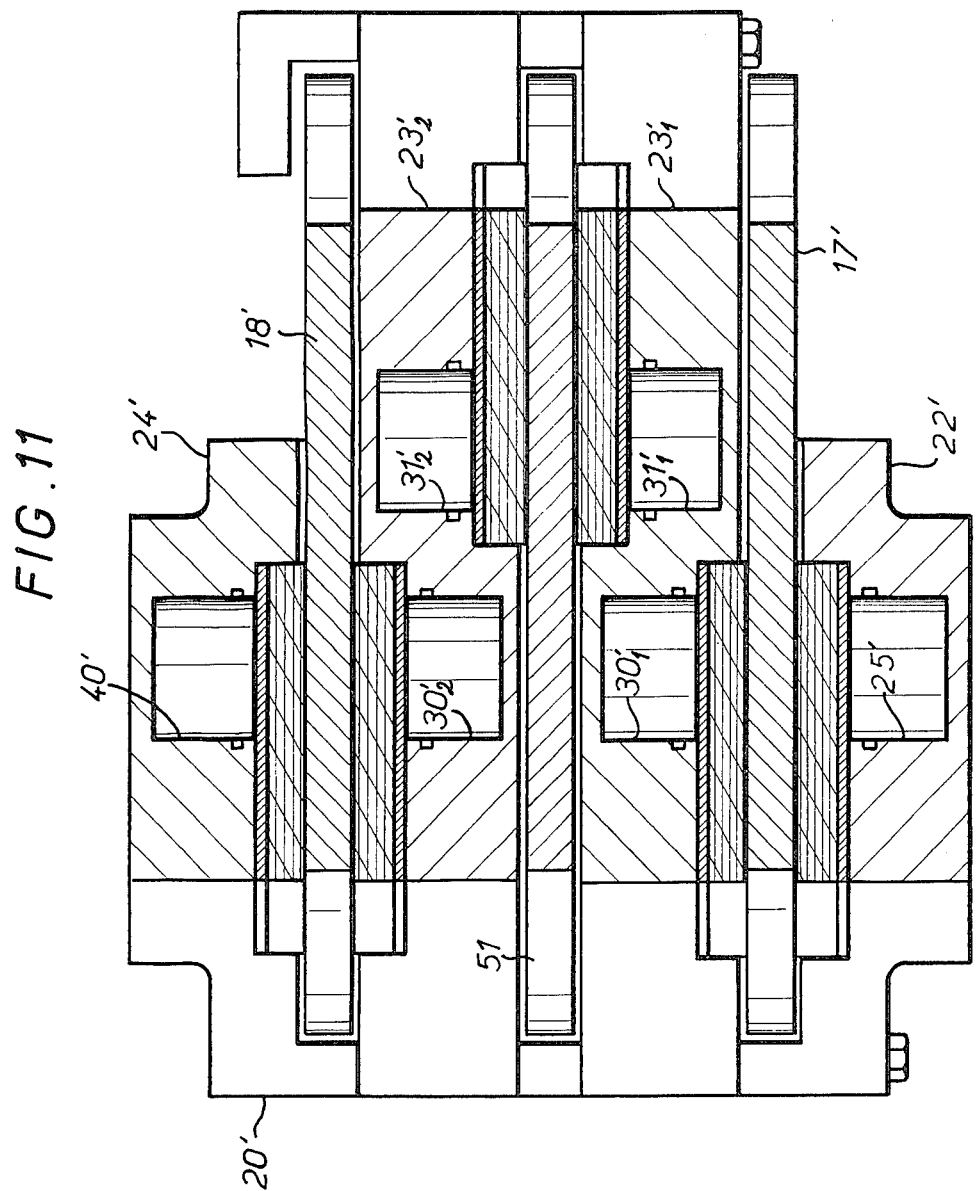

ACTUATOR MOUNTING ASSEMBLY FOR A MULTI-DISC BRAKE

The present invention relates to a disc brake, especially for automobile vehicles, and more particularly for heavy automobile vehicles.

The overall dimensions of the disc inside the rim of the wheel is limited by the space which is available in that place. At the present time there is a tendency to reduce the diameter of the rims, whereas the performances of vehicles increase regularly. It thus becomes increasingly difficult to place a disc of satisfactory dimensions in position inside the wheel. This difficulty may be overcome if the performance of the disc is increased, by utilizing for example a disc provided with internal ventilation channels. This measure is however still insufficient in numerous applications, heavy lorry vehicles, machines, etc., and in any case it increases substantially the cost of construction.

It is also possible to increase the number of discs, following the current technique in aeronautics. Several discs are provided so as to be axially mobile and gripped in a common stirrup member, but the cooling is slow, which is inacceptable for the application to automobile vehicles. Furthermore, this arrangement makes it necessary to provide splines on the moving discs and their hub, which in this case also increases the cost of construction.

Certain vehicles are thus equipped with several discs mounted inside the same stirrup with friction linings interposed between the discs. The discs are axially free and the stirrup is mobile, which enables the provision of pistons between the discs to be dispensed with and thus reduces the axial dimensions of the brake.

However, brakes of this kind have various disadvantages, in particular: expensive splines with a risk of jamming of the discs on these splines during the course of their movement; the residual friction due to the moving stirrup which increases the wear of the friction linings to a considerable extent, which constitutes a major drawback, especially with heavy lorry vehicles; and the floating of the discs during the running of the vehicle, which is liable to increase still further the wear of the linings and to affect the cooling adversely.

In order to overcome these various disadvantages, it is possible to provide a multi-disc brake in which the discs and the stirrups are fixed axially.

The present invention relates to a multi-disc brake of this kind comprising at least two rotating discs, fixed and spaced apart axially, rigidly fixed on the brake rotor, and stirrup means rigidly fixed on the stator of the brake.

In brakes of this kind, and especially in two-disc brakes, the brake is generally produced by arranging two single-disc brakes one following the other, utilizing all the circumferential space available, that is to say: for one of the discs an individual stirrup is provided, while for the other disc another individual stirrup is used, staggered circumferentially with respect to the first.

This method of procedure doubtless gives good results for the braking considered by itself, since the traditional technique of the single disc is employed, but it has the disadvantage of poor cooling. In fact, substantially all the circumference of the disc is occupied by the brake members, which leaves insufficient room for the ventilated zones. In addition, these known devices have the disadvantage of leaving at least part of the brake members and their actuating system exposed to bad weather and mud.

In other known brakes, the stirrup is arranged in monobloc construction with an intermediate portion in which the pistons co-operating respectively with the discs are in line with each other, which gives a large axial dimension and this may be prohibitive in the application to atuomobile vehicles. In addition, this arrangement lends itself badly to the conditions of safety of a double circuit and to easy replacement of the friction linings, that is to say without dismantling the brake.

The present invention has for its object a multidisc brake of the kind referred to above, with axially-fixed discs and fixed stirrup means, which is free from the various disadvantages previously referred to, the construction of which is simple and convenient, the operation is excellent and the cooling is adequate, with very good protection against bad weather, this brake having the further advantage of great ease of replacement of the friction linings.

A multi-disc brake according to the invention has fixed stirrup means comprising on the one hand two outer portions arranged on the outside of the discs and each having cylinder means receiving piston means adapted to apply friction-lining means axially against the corresponding disc, and on the other hand at least one intermediate portion arranged between the discs and having piston means adapted to apply friction-lining means against the discs, and is especially characterized by the three following aspects which may be taken separately or preferably wholly or partly in combination:

1. According to a first aspect, the cylinder means of the intermediate portion which co-operate with a disc are circumferentially staggered with respect to the cylinder means of the intermediate portion which co-operate with another disc, the various cylinder means of the intermediate portion being blind and each extending axially over a depth in the vicinity of the thickness of the intermediate portion;

2. According to a second aspect, the various portions of the stirrup means are constituted by separate parts assembled together by fixing means;

3. According to a third aspect, the various portions of the stirrup means are assembled together in an angular sector of about 180°.

By virtue of such an assembly of the various parts of the stirrup in an angular sector of about 180°, the opposite sector of about 180°, in which the discs are directly in contact with the air, if freed, permitting excellent cooling of the brake.

In addition, the position of the semi-circumference comprising the stirrup means can be chosen at will so as to give the best possible protection of these stirrup means and of their actuation system. In general, in a brake fitted in an automobile vehicle, the position of the stirrup means will be chosen in the upper semi-circle which provides the best protection against bad weather and mud, while the free portions of the discs which extend into the lower semi-circle become cooled under the best possible conditions during the running of the vehicle.

It will be appreciated that this advantageous assembly of the stirrup means in a sector of 180° does not necessarily imply an increase in the overall axial dimension of the brake, since the intermediate potion of the stirrup has its thickness which is not doubled, contrary to known multi-disc brakes but which is single by virtue of the circumferential staggering of the cylinder means of the intermediate portion which co-operate respectively with the two discs.

It should be noted that in the brake according to the invention, it is very easy to change the friction linings.

The cylinder means of an external portion of the stirrup means associated with a disc are preferably arranged facing the cylinder means of the intermediate portion which are associated with this disc, while the cylinder means of the other external portion of the stirrup means associated with another disc are arranged facing the cylinder means of the intermediate portion which are associated with this other disc. By virtue of this arrangement, symmetrical conditions are obtained which are favourable to the gripping action on each of the discs.

According to another characteristic feature, the fixing means are divided into three groups arranged substantially at the corners of a triangle: two end groups which are respectively arranged at the extremities of the outer portions of the stirrup and a central group which is arranged substantially in a central zone of the intermediate portion of the stirrup. This method of fixing in three zones which are arranged at the corners of a triangle provides extreme robustness of assembly and great rigidity, permitting uniform wear of the friction linings.

The cylinder means of an external portion of the stirrup and the cylinder means of the intermediate portion of the stirrup which are associated with a disc, preferably co-operate with a hydraulic supply source which is independent of another hydraulic supply with which co-operate the cylinder means of the other external portion of the stirrup and the cylinder means of the intermediate portion of the stirrup which are associated with another disc. This arrangement makes it possible to satisfy the condition of a double circuit favourable to safety in braking, without any particular complications.

According to the invention, packing pieces are advantageously interposed between the external parts and the intermediate portion of the stirrup, in order to permit the adaptation of the brake to various thicknesses of discs.

It will be appreciated that the two external portions of the stirrup can be employed in their actual state so as to constitute a single disc, and the present invention has also for its object a single-disc brake, characterized in that its stirrup is constituted by the two external portions assembled directly together, of the stirrup of the multi-disc brake described above. This arrangement has a particular advantage of standardardization in the application to heavy lorry vehicles in which double-disc brakes can be utilized on the rear axle and single-disc brakes on the front axle.

Forms of embodiment of the invention are described below by way of example, reference being made to the accompanied drawings, in which:

FIG. 4 is a view in elevation with parts broken away of the intermediate portion of the stirrup of the brake shown in FIGS. 1 to 3;

FIG. 5 is a view of this intermediate portion in cross-section, taken along the line V—V of FIG. 4;

FIG. 6 is a lateral view with parts broken away, of the said intermediate portion, taken in the direction of the arrow VI of FIG. 4;

FIGS. 7 and 8 are views in cross-section of this intermediate portion, taken respectively along the line VII—VII of FIG. 4 and the line VIII—VIII of FIG. 6;

FIG. 11 is a view in cross-section of a three-disc brake in accordance with the invention.

Reference will first be made to FIGS. 1 to 8 which relate by way of example to an application of a double-disc brake according to the invention, to a wheel of a heavy lorry automobile vehicle.

Figure 3:
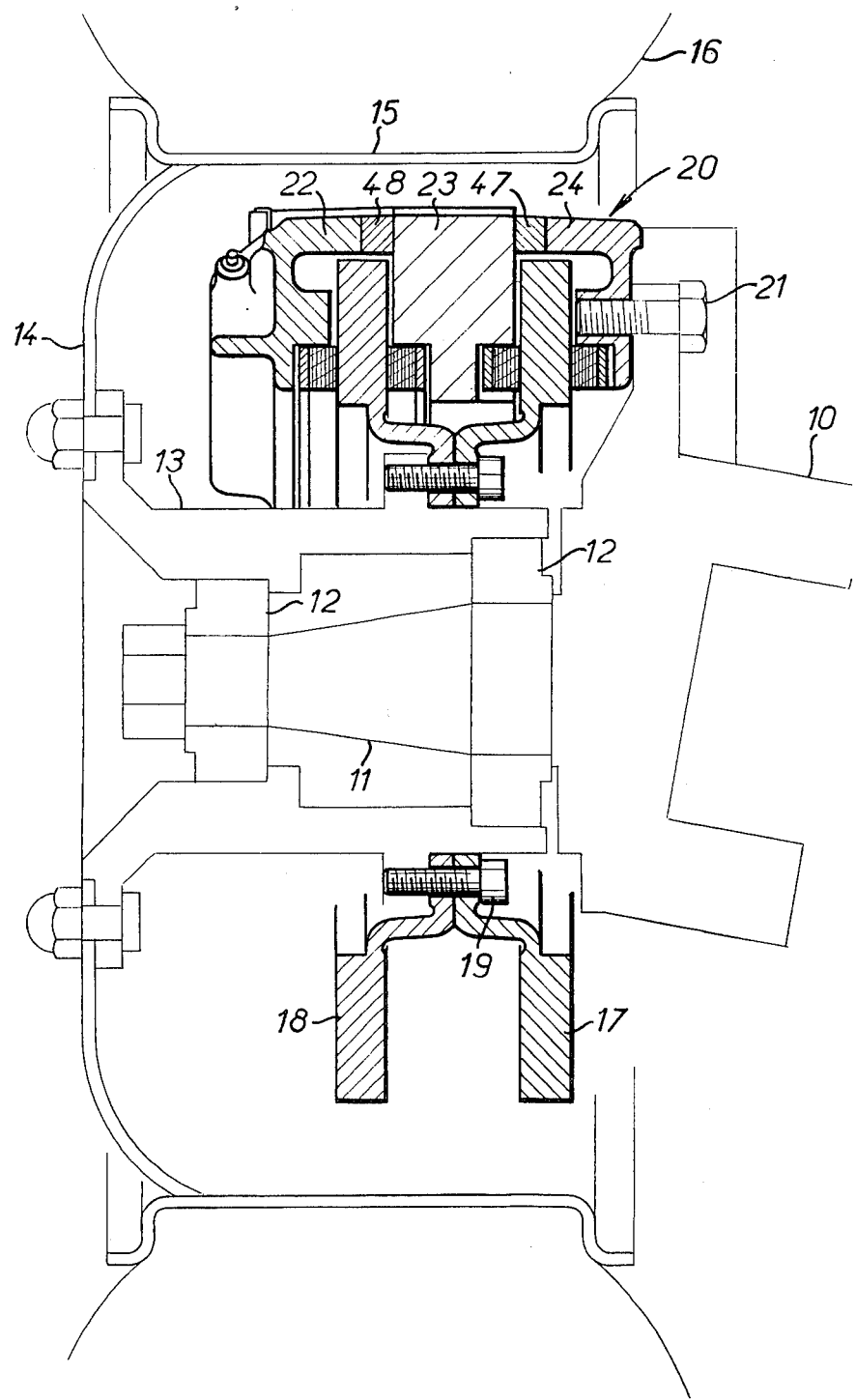
FIG. 3 is a view of the said brake in vertical section, taken along the line III—III of FIG. 1, and shows the wheel of a vehicle on which this brake is mounted.

In FIG. 3, the stator 10 of the wheel and the brake has the form of a small trumpet 11 on which the rotor 13 of the wheel and the brake is rotatably mounted by means of bearings 12. On the rotor is mounted the web 14 of the wheel, the rim of which is seen at 15 and the pneumatic tyre at 16.

The double-disc brake according to the invention comprises two rotating discs 17 and 18 fixed and spaced apart axially, rigidly fixed by screws 19 on the rotor 13. The brake also comprises a fixed stirrup member 20 fixed on the stator 10 by screws 21.

The stirrup 20 is in three parts 22, 23, 24 formed by separate pieces assembled together by the screws 21.

The portion 22 or external portion, is arranged outside the disc 17 and co-operates with this latter. The so-called intermediate portion 23 is arranged between the discs 17 and 18 and co-operates with both these discs. The portion 24 also known as an external portion, is arranged outside the disc 18 and co-operates with this latter.

Figure 1:
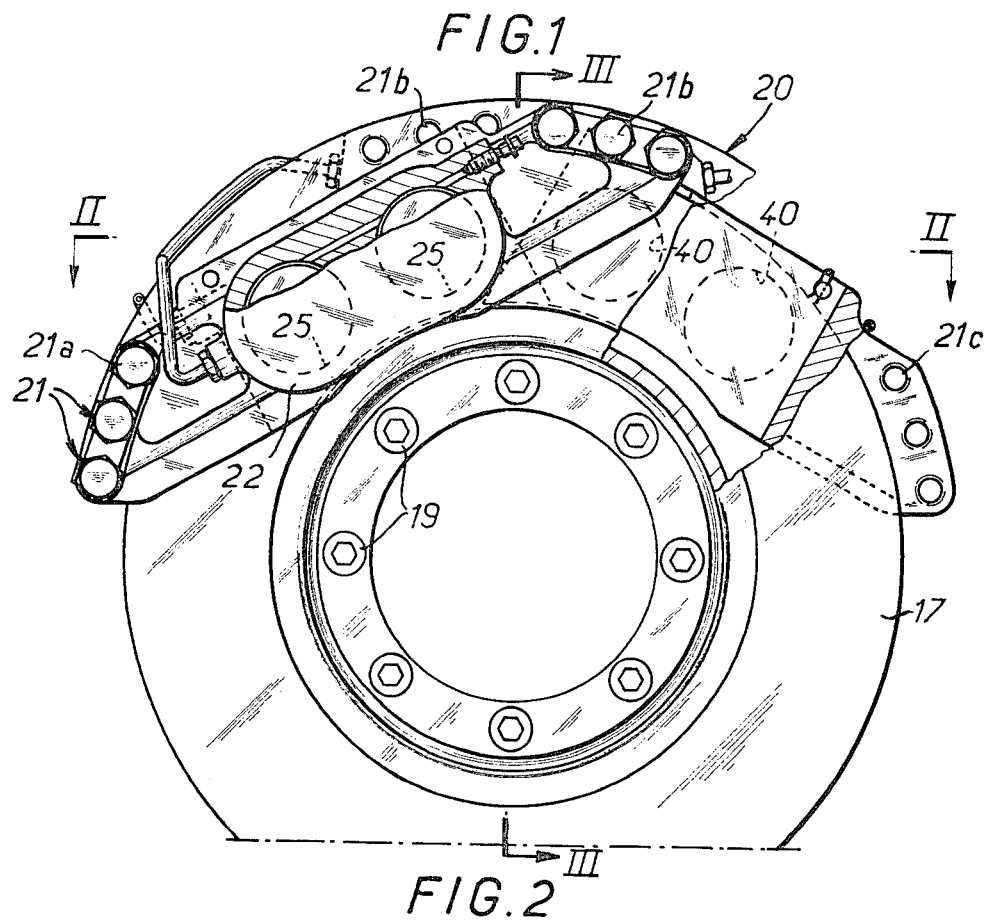
FIG. 1 is a view in elevation with parts broken away of a double-disc brake according to the invention.
Figure 2:
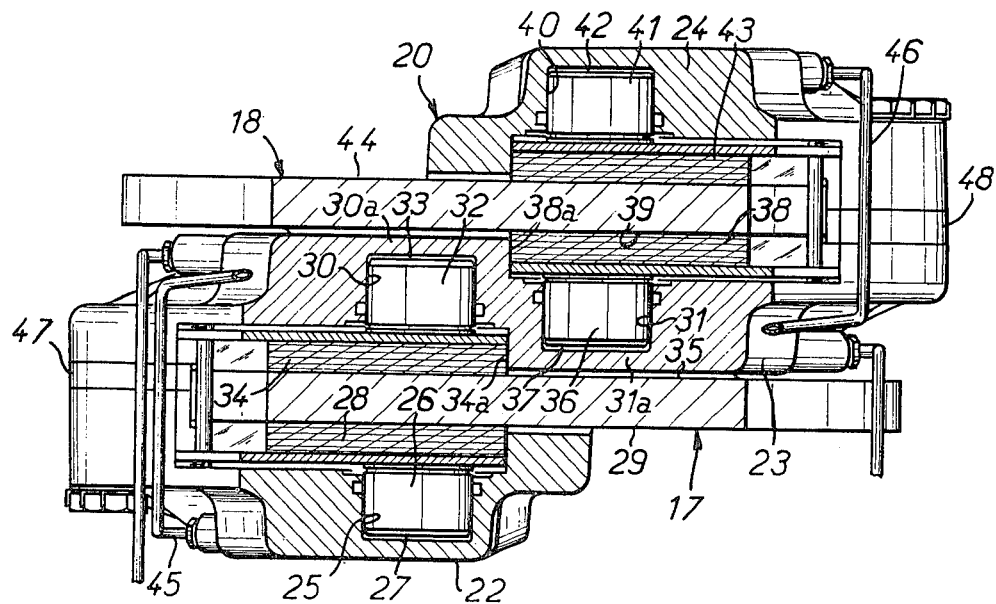
FIG. 2 is a view of this brake in horizontal section taken along the line II—II of FIG. 1.

As shown in FIG. 2, the portion 22 comprises two blind cylinders 25 arranged side by side. Each cylinder 25 recieves a piston 26 in such a manner as to define a hydraulic chamber 27. The pistons 26 are adapted to thrust axially against a friction lining 28, forcing the latter against the outer face 29 of the disc 17.

The intermediate portion 23 comprises two blind cylinders 30 and also two other blind cylinders 31, all placed circumferentially side by side, one after the other, but the cylinders 31 have their opening which is opposite to that of the cylinders 30 in the axial direction. The portion 23 is provided with cooling fins 23a (see FIGS. 4 to 8).

Each cylinder 30 of the intermediate portion 23 (see FIG. 2) receives a piston 32 in such manner as to define a hydraulic chamber 33. The pistons 32 are adapted to push a friction lining 34 axially against the internal face 35 of the disc 17.

Each cylinder 31 of the intermediate portion 23 receives a piston 36 in such manner as to define a hydraulic chamber 37. The pistons 36 are adapted to push a friction lining 38 axially against the internal face 39 of the disc 18.

The external portion 24 comprises two blind cylinders 40 arranged side by side. Each cylinder 40 receives a piston 41 in such manner as to define a hydraulic chamber 42. The pistons 41 are adapted to push a friction lining 43 axially against the outer face 44 of the disc 18.

The hydraulic chambers 27 and 33 corresponding to the disc 17 receive an independent hydraulic supply through a control circuit 45 while the hydraulic chambers 37 and 42 corresponding to the disc 18 receive an independant supply through a separate circuit 46, which enables the safety in braking to be ensured. In the event of rupture of a circuit preventing the gripping of one of the discs, the other circuit permits the clamping action on the other disc.

It will be noted that the cylinders 25 and 30 are placed exactly opposite each other while the cylinders 31 and 40 are also placed exactly facing each other, which provides perfectly symmetrical conditions of clamping for each disc, favorable for braking.

Between the external portion 22 and the intermediate portion 23 of the stirrup 20 is arranged a packing shim 47, while between the portion 23 and the portion 24 of the stirrup 20 is similarly arranged a packing shim 48. This arrangement enables the brake to be readily adjusted for discs 17 and 18 of various thicknesses.

It will be appreciated that the external portions 22 and 24 and the intermediate portion 23 of the stirrup 20 are assembled together (see FIG. 1) in an angular sector slightly less than 180° (upper portion of FIG. 1) thus leaving free an opposite sector of more than 180° (lower portion of FIG. 1) in which the discs 17 and 18 are perfectly free from parts of the brake and control system.

It will also be observed that in the brake according to the invention, the friction linings 28, 34, 38 and 43 are very easy to change.

In addition, as can be seen from the various FIGS. 1 to 8, the cylinders 30 of the intermediate portion 23 are circumferentially staggered with respect to the cylinders 31 of this same portion 23, and all these cylinders 30 and 31 each extend axially (see FIGS. 2, 5 and 6) over a depth which is close to the thickness of the intermediate portion 23, which enables the brake to have a reduced axial dimension.

As can be more particularly seen from FIG. 2, the friction linings 34 and 38 corresponding to the intermediate portion 23 are respectively received in housings 34a and 38a of the portion 23. The depth of the housing 34a is greater than the thickness of the bottom 31a of the blind cylinder 31, and similarly the depth of the housing 38a is greater than the thickness of the bottom 30a of the blind cylinder 30.

This arrangement, which is permitted by the circumferential staggering of the cylinders 30 and 31 has the additional advantage of still further reducing the overall thickness of the intermediate portion 27 and in consequence the axial dimension of the brake.

The screws 21 enable the stirrup 20 to be fixed on the stator 10 and serve at the same time for fixing the various parts 22, 23 and 24 to each other, including the packing shims 47 and 48.

As can more particularly be seen from FIGS. 1 to 4, these screws 21 are divided into three groups 21a, 21b and 21c, arranged substantially at the corners of a triangle. The end groups 21a and 21c are arranged at the extremities of the external portions 22 and 24 of the stirrup, while the central group 21b is arranged substantially in a central zone of the intermediate portion 23 of the stirrup 20. A particularly robust fixing is thereby obtained.

It will be appreciated that the brake which has just been described with reference to FIGS. 1 to 8 is of a particularly simple and convenient construction with a small overall size, both circumferential and axial. It has excellent cooling by virtue of the fins 23a of the portion 23, and also due to the fact that the lower portion of the brake comprises solely the discs 17 and 18, exposed to the ventilation air. Furthermore, the stirrup 20 and the hydraulic control circuits 45 and 46 are protected from mud and bad weather, since they are located only in the upper half of the brake. In addition, the fact that the circuits 45 and 46, respectively associated with the two discs 17 and 18 are independent, provides excellent safety in braking.

Figure 9:
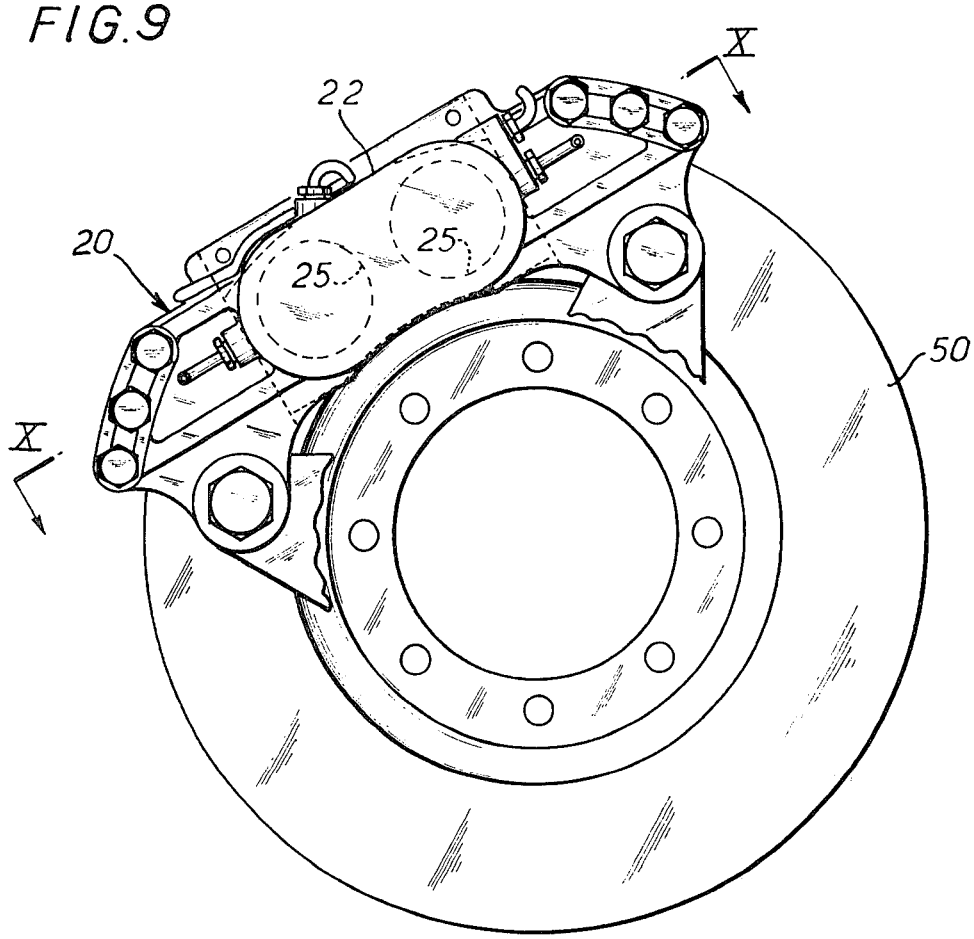
FIG. 9 is a view in elevation of a single-disc brake utilizing the external portions of the stirrup of the brake shown in FIGS. 1 to 3.
Figure 10:
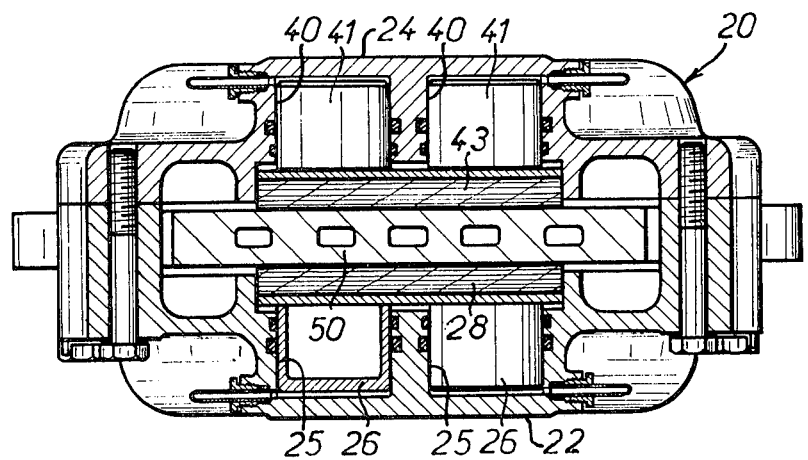
FIG. 10 is a view of this single-disc brake in cross-section, taken along the line X—X of FIG. 9.

The external portions 22 and 24 of the brake of FIGS. 1 to 8 may be utilized in their actual state so as to constitute a single-disc brake (see FIGS. 9 and 10).

The cylinders 25 of the portion 22 are arranged exactly opposite the cylinders 40 of the portion 24. There will again be seen at 28 and 43 the friction linings associated with these cylinders, but in this case these linings are adapted to clamp the single disc of the brake, having here the reference number 50.

The possibility of utilizing the portions 22 and 24 of the double-disc brake of FIGS. 1 to 8 so as to constitute the single-disc brake of FIGS. 9 and 10 has an advantage of standardization, especially in the application to heavy lorry automobile vehicles, in which double-disc brakes may be used on the rear axle, while single-disc brakes can be utilized on the front axle.

The invention which has been described with reference to FIGS. 1 to 8 in its application to a double-disc brake may also be applied to all multi-disc brakes, and for example to a three-disc brake such as shown in FIG. 11.

In this FIG. 11, the same reference numbers have been employed as in FIGS. 1 to 8 for indicating similar parts, followed however by an apostrophe.

In FIG. 11 there are again seen at 22' and 24' the external portions of the stirrup 20', but two intermediate portions 23'₁ and 23'₂ are provided in this case instead of a single portion 23.

The portions 22' and 23'₁ co-operate with a first disc 17', while the portions 23'₂ and 24' co-operate with the second disc 18'. As regards the two intermediate portions 23'₁ and 23'₂, these co-operate with the third disc having the reference 51.

The arrangement and the operation of the three-disc brake of FIG. 11 are furthermore similar to those which have been described with reference to the double-disc brake of FIGS. 1 to 8. It will be observed that the circumferential dimension of this three-disc brake is not increased as compared with a corresponding double-disc brake.

I claim:

1. In a multi-disc brake comprising at least two rotating discs fixed to each other and spaced apart axially and rigidly fixed on a rotor of said brake, and stirrup means rigidly fixed to a stator of said brake and comprising first and second external portions between which said discs are disposed and at least one intermediate portion disposed between said discs, each said external portion having at least one cylinder and piston assembly for applying a friction lining means associated therewith axially against an adjacent said disc, said at least one intermediate portion therefor insuring at least one pair of cylinder and piston assemblies oriented in opposite axial directions from said at least one intermediate portion to apply friction lining means associated therewith against said discs on opposite sides of said at least one intermediate portion, said cylinder and piston assemblies of said at least one intermediate portion being circumferentially staggered and said cylinders being blind and each extending axially over a depth close to the thickness of said at least one intermediate portion; the improvement in which said first and second external stirrup portions and said at least one intermediate stirrup portion are constituted by separate members, and means releasably fixing together all said stirrup portions in an angular sector of about 180° about the axis of said rotor, said fixing means being disposed in three groups spaced apart peripherally about said discs and disposed substantially at the corners of a triangle, a first of said corner groups of said fixing means being disposed at one end of said first external portion and at one end of said intermediate portion, a second of said corner groups of said fixing means being disposed at one end of said second external portion and at the other end of said at least one intermediate portion, and a third of said corner groups of said fixing means being disposed at the other ends of said first and second external portions and substantially at a central zone of said at least one intermediate portion.

2. A brake as claimed in claim 1, said cylinders having bottoms, said at least one intermediate portion having housings to receive said respective friction lining means, the depths of said housing being greater than the thickness of said bottoms.

3. A brake as claimed in claim 1, in which at least one portion of said fixing means fixes said stirrup means to the stator of said brake.

4. A brake as claimed in claim 1, said cylinder and piston assembly of said external portions being disposed coaxially with opposed said cylinder and piston assemblies of said at least one intermediate portion on opposite sides of said discs.

5. A brake as claimed in claim 1, and independent hydraulic supply means for the cylinder and piston assemblies associated with each said disc.

6. A brake as claimed in claim 1, there being but two said discs and only a single said intermediate stirrup portion therebetween.

7. A brake as claimed in claim 1, there being three said discs and a single said intermediate stirrup.

8. A brake as claimed in claim 1, said rotor rotating about a horizontal axis, and all said cylinder and piston assemblies being disposed above a horizontal plane that includes said horizontal axis.

* * * * *